Oct. 17, 1933.   W. L. SCHMITZ, JR   1,930,944
MEASURING DISPENSER
Filed Dec. 21, 1932
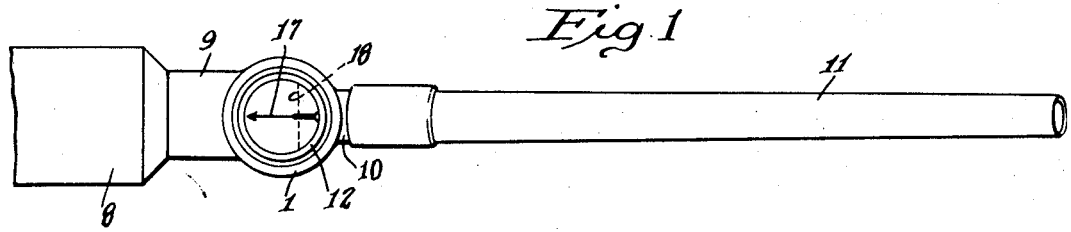
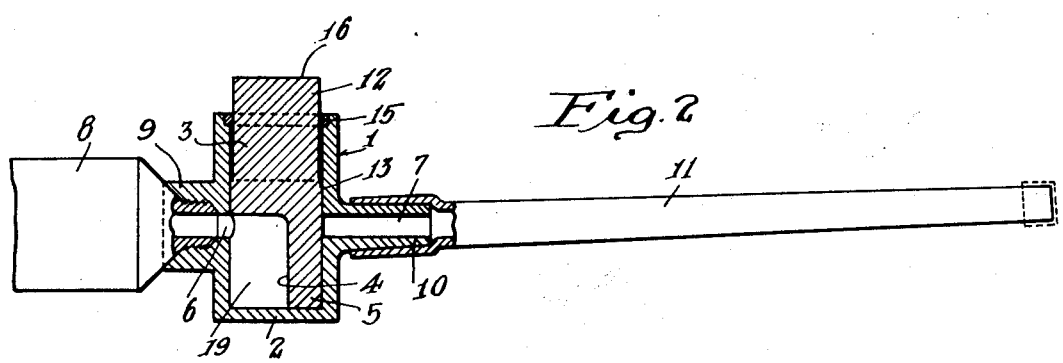
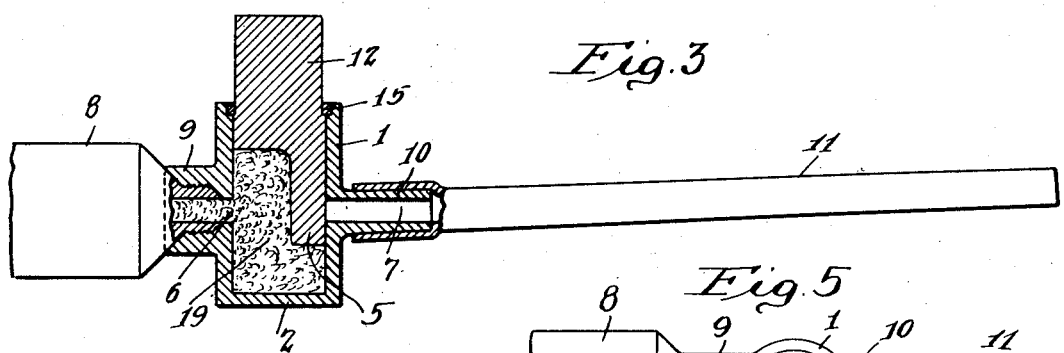
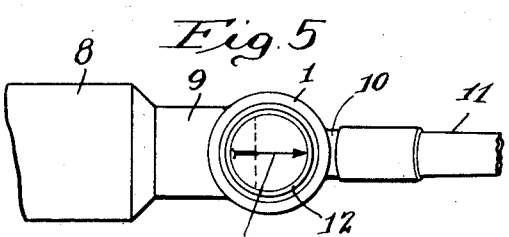
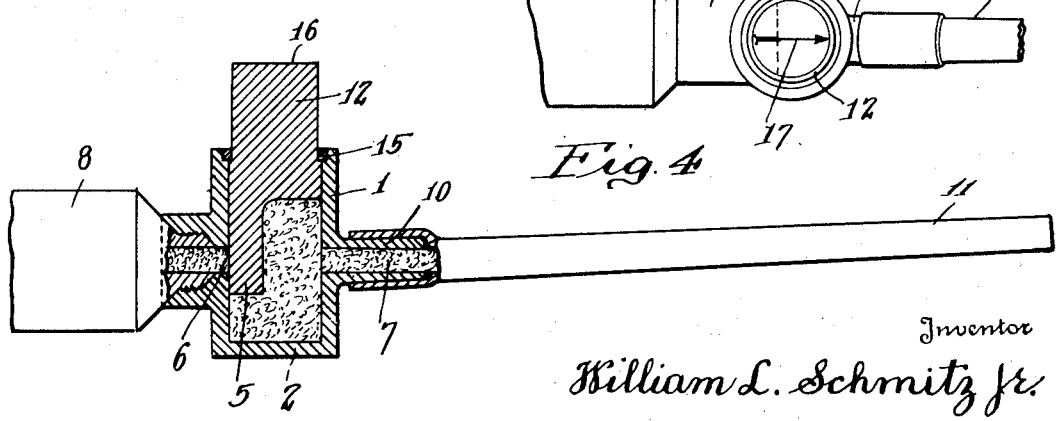
Inventor
William L. Schmitz Jr.
By Lyon & Lyon
Attorneys Patented Oct. 17, 1933

1,930,944

UNITED STATES PATENT OFFICE 1,930,944

MEASURING DISPENSER

William L. Schmitz, Jr., Los Angeles, Calif.

Application December 21, 1932
Serial No. 648,194

5 Claims. (Cl. 221—116)

This invention relates to a measuring dispensing device for the purpose of measuring a small quantity of fluid or semi-fluid substance. The invention is particularly useful when applied to a small medical accessory for injecting a small quantity of gelatin such as vaseline, into the body. The general object of the invention is to provide a device of this kind of simple construction, which can be readily manipulated to enable it to receive a certain quantity of substance, and then eject the same for any purpose for which the substance is to be employed.

Further objects of the invention will appear hereinafter.

The invention consists of the novel parts and combination of parts to be described hereinafter, all of which contribute to produce an efficient measuring dispenser.

A preferred embodiment of the invention is described in the following specification, while the broad scope of the invention is pointed out in the appended claims.

In the drawing:

Figure 1 is a plan of a device embodying my invention;

Figure 2 is a longitudinal, vertical section through the device, a portion of the injector tube being broken away and shown partly in elevation; this view also indicates partly in section and partly in elevation, a collapsible tube such as employed as containers for gelatin, vaseline or any other substance which it may be necessary to supply in a measured quantity. This figure shows the plunger of the device set for receiving the load or charge;

Figure 3 is a view similar to Figure 2, and showing the measuring chamber of the device fully charged with the substance which is to be dispensed;

Figure 4 is a view similar to Figure 3, but showing the plunger in position just before the charge is expelled from the device;

Figure 5 is a plan similar to Figure 1, certain parts being broken away. Figures 1 and 5 indicate in dotted lines, the relation of the gate of the plunger with respect to the inlet and outlet ports of the device.

Referring more particularly to the parts, this device includes a casing 1, which is preferably in the form of a small cylinder having an integral head 2 at one end. In this casing, I mount a plunger 3 so that it is capable of reciprocation in the casing, and also capable of rotation, at will. This plunger is preferably cut away at its inner end to form a cavity 4, and this leaves an extension 5 at the inner end of the plunger, which is a gate to control the inflow and outflow of the material from the casing, as will appear hereinafter. At a point on the wall of the casing, an inlet passage 6 is provided, and at another point an outlet passage 7 is formed in the casing. In case the device is to be used as a medical accessory for dispensing a gelatinous substance carried in a collapsible tube such as the tube 8, the casing at the inlet passage 6 is preferably provided with a threaded socket 9 to receive the standard threaded nipple on the end of the tube.

The outlet passage 7 is preferably formed in a short nipple 10 which is integral with the casing and adapted to receive a removable nozzle 11 which can be used as an injector nozzle when employing the device.

Suitable means is provided for limiting the outward movement of the plunger in the casing. For this purpose in the present instance, the outer end 12 of the plunger is of reduced diameter so that a narrow, annular shoulder 13 is formed on the plunger. The outer end of the cylinder is formed with a rabbet groove into which a keeper in the form of a ring is tightly forced. However, although the ring is tight in the casing, the neck 12 of the plunger should slide freely through it. Evidently, the striking of the shoulder 13 against the ring 15, limits the outward movement of the plunger, and this, of course, is the extreme outward position that the plunger can assume. In the innermost position of the plunger, the end of the gate 5 is against the head 2, as illustrated in Figure 2.

Associated with the exposed portion of the plunger, I provide suitable means for indicating the location of the gate 5, with respect to the inlet and the outlet. For this purpose I may provide a flat end face 16 on the outer end of the plunger, and provide the same with an indicating arrow 17 which extends diametrically on the face of the plunger.

The inner face 18 of the gate is preferably a plane vertical face. That is to say, it is preferably parallel with the longitudinal axis of the plunger.

The inlet 6 and the outlet 7 are also preferably located diametrically opposite to each other and coaxial with each other. This facilitates the molding of the casing 1, although it prevents the passage 7 from having its central axis coincide with the geometrical axis of the nipple 10 because the geometrical axis of the nipple 10 is preferably inclined upwardly slightly as indicated in Figure 2, so as to give a slight inclination to the nozzle 11. The device depends for its operation on the fact that the plunger can be rotated to enable the gate 5 to cover either the inlet or the outlet as may be desired, and also on the fact that when the receiving chamber 19 formed between the inner end of the plunger and and the head 2 is full of the charge, the substance can be expelled simply by pushing in on the exposed end of the plunger, having regard to the position of the gate. The inlet 6 and the outlet 7 however, should be located so that in the inmost position of the plunger, they can communicate with the cavity 4 of the plunger if the position of the gate 5 is such as to permit this. Furthermore, in the extreme outward position of the plunger indicated in Figure 3, the gate must be capable of covering either the inlet or the outlet, according to the position of the gate.

The mode of operation of the device will now be evident, but will now be briefly stated. In using the device for dispensing a measured charge from the collapsible tube such as the tube 8, the tube is attached in the threaded socket 9, (see Fig. 2) with the plunger shoved in and with the gate 5 covering the outlet 7. By squeezing the collapsible tube 8, a quantity of the substance in it will pass in through the inlet 6 and fill the cavity 4, and will then force the plunger outwardly to the extreme position indicated in Figure 3. The plunger should then be rotated around to the opposite position indicated in Figure 4, thereby covering the inlet 6 with the gate 5. By pressing down on the head of the plunger, the charge can then be expelled into the injector nozzle 11. Of course, it will require several repeated operations before the device can commence to eject the substance from the end of the nozzle, because the bore of the nozzle and the interior of the casing must become completely filled with the substance before discharging from the end of the nozzle can begin.

Inasmuch as the cavity 4 is completely full of the substance at all times, it will be evident that the charge that passes from the casing at each inward movement of the plunger, is the volume of the inner end of the casing below the lower end of the gate. If the device is constructed for use in a situation where variable charges must be dispensed, the head 2 of the casing may be made adjustable in any suitable manner.

The inner face 18 of the wing 5, is preferably located far enough from the central axis of the plunger to enable it to clear a wire shoved through the inlet and outlet ports 7 in case the device should become plugged up from any cause. In other words, by turning the arrow 17 to a position at right angles to that in which it is shown in Figure 1, and removing the tube 8 and the nozzle 11, a wire could be shoved through the inlet and outlet.

It is understood that the embodiment of the invention described herein is only one of the many embodiments this invention may take, and I do not wish to be limited in the practice of the invention, nor in the claims, to the particular embodiment set forth.

What I claim is:—

1. In a measuring dispensing device, the combination of a casing, a plunger mounted for rotation and longitudinal movement in the casing, said casing having an inlet passage at one point in its wall and an outlet passage at another point in its wall, means for limiting the outward movement of the plunger in the casing, said plunger having an extension at one side extending along the wall of the casing and capable of closing the inlet or the outlet in the extreme outward position of the plunger, said plunger and casing cooperating to form a receiving chamber for the substance passing into the casing through the inlet to fill the receiving chamber, the rotation of the plunger thereafter operating to close the inlet and enabling the plunger to be moved inwardly to the limit of its inward movement to expel a measured quantity of the substance through the outlet.

2. In a measuring dispensing device, the combination of a casing, a plunger mounted for rotation and longitudinal movement in the casing, said casing having an inlet passage at one point in its wall and an outlet passage at another point in its wall, means for limiting the outward movement of the plunger in the casing, said plunger having an extension at one side extending along the wall of the casing and capable of closing the inlet or the outlet in the extreme outward position of the plunger, said plunger and casing cooperating to form a receiving chamber for the substance passing into the casing through the inlet to fill the receiving chamber, the rotation of the plunger thereafter operating to close the inlet and enabling the plunger to be moved inwardly to the limit of its inward movement to expel a measured quantity of the substance through the outlet, and means associated with the plunger for indicating the location of the gate with reference to the inlet and the outlet.

3. In a measuring dispensing device, the combination of a casing, a plunger mounted for reciprocation and rotation in the casing, said casing having an inlet passage at one point in its wall and an outlet passage at another point in its wall, means for limiting the outward movement of the plunger in the casing, said plunger having an extension at one side extending along the wall of the casing and capable of closing the inlet or the outlet in the extreme outward position of the plunger.

4. In a measuring dispensing device, the combination of a casing in the form of a cylinder with a head at one end, a plunger mounted for reciprocation and rotation in the casing, said casing having an inlet passage at one point in its wall and an outlet passage at another point in its wall, means for limiting the outward movement of the plunger in the casing, said plunger having an extension at one side extending along the wall of the casing and capable of closing the inlet or the outlet in the extreme outward position of the plunger, the end of said plunger opposite the gate having a cavity therein, said inlet and said outlet being located so as to communicate with said cavity in the extreme inmost position of the plunger.

5. In a measuring dispensing device, the combination of a casing in the form of a cylinder with a head in one end, a plunger mounted for reciprocation and rotation in the casing, said casing having an inlet passage at one point in its wall and an outlet passage at another point in its wall, means for limiting the outward movement of the plunger in the casing, said plunger having an extension at one side extending along the wall of the casing and capable of closing the inlet or the outlet in the extreme outward position of the plunger, the end of said plunger opposite the gate having a cavity therein, said inlet and said outlet being located so as to communicate with said cavity in the extreme inmost position of the plunger, and means associated with the plunger for indicating the location of the gate with reference to the inlet and the outlet.

WILLIAM L. SCHMITZ, Jr.